United States Patent Office 3,637,706
Patented Jan. 25, 1972

3,637,706
10-[4 - (LOWER)ALKYLPIPERAZINO] - 1,2,3,4-TETRAHYDROBENZO[b][1,6]NAPHTHYRIDINE DERIVATIVES USEFUL AS CNS DEPRESSANTS
Milton Wolf, West Chester, and James L. Diebold, Havertown, Pa., assignors to American Home Products Corporation, New York, N.Y.
No Drawing. Division of application Ser. No. 760,063, Sept. 16, 1968, which is a continuation-in-part of applications Ser. No. 533,802 and Ser. No. 533,793, Mar. 14, 1966, and Ser. No. 581,756, Sept. 22, 1966. This application Apr. 30, 1970, Ser. No. 33,509
Int. Cl. C07d 51/70
U.S. Cl. 260—268 TR                            2 Claims

ABSTRACT OF THE DISCLOSURE

This invention concerns 10-[4-(lower)alkylpiperazino]-1,2,3,4 - tetrahydrobenzo[b][1,6]naphthyridines and the pharmacologically acceptable acid addition salts thereof which are pharmacologically active as central nervous system depressants which are useful in producing a calming effect in warm-blooded animals.

---

This application is a division of U.S. patent application Ser. No. 760,063, entitled "1,2,3,4 - Tetrahydrobenzo[b][1,6]Naphthyridine Derivatives," filed on September 16, 1968 by Milton Wolf and James L. Diebold, which in turn is a continuation-in-part of now abandoned U.S. patent applications: Ser. No. 533,802, entitled "10-Aminobenzo[b][1,6]Naphthyridines," filed on Mar. 14, 1966 by Milton Wolf; Ser. No. 533,793, entitled "1,2,3,4-Tetrahydrobenzo[b][1,6]Naphthyridine Derivatives," filed on Mar. 14, 1966 by Milton Wolf and James L. Diebold; and Ser. No. 581,756, entitled "1,2,3,4-Tetrahydrobenzo[b][1,6]Naphthyridine Derivatives," filed Sept. 22, 1966 by Milton Wolf and James L. Diebold.

This invention is directed to novel compounds classified in the art of organic chemistry as benzonaphthyridines and to a process for making some of these compounds. More particularly, the present invention is concerned with 1,2,3,4-tetrahydrobenzo[b][1,6]naphthyridines and 1,2,3,4,4a,5,10,10a - octahydrobenzo[b][1,6]naphthyridine derivatives, which in standard and accepted pharmacological tests have demonstrated central nervous system depressant activity which is useful in producing a calming effect in warm-blooded animals.

In its composition aspect, the claimed invention resides in a composition of matter having a tetrahydro or a octahydrobenzo[b][1,6]naphthyridine substituted nucleus. These compounds are exemplified by the following formulae:

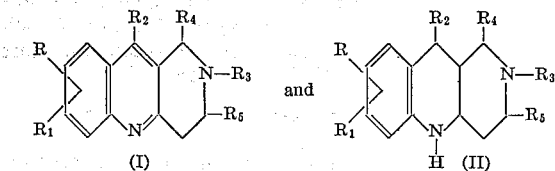

wherein R and $R_1$ are selected from the group consisting of hydrogen, halogen, nitro, lower alkyl, lower alkoxy, lower alkylthio, lower alkylsulfonyl, carbamoyl, sulfamoyl, and trifluoromethyl; $R_2$ is selected from the group consisting of hydrazino, amino, aminoanilino, anilino, di(lower)alkyl-amino(lower)alkylamino, amino(lower)alkylthio, phenyl, sulfamylphenyl, carboxyphenyl, phenylhydrazino, halophenyl, lower alkylphenyl, lower alkoxyphenyl, lower alkylthiophenyl, phenoxy, phenthio, morpholino, pyridyl, thienyl, and furyl, 4-alkyl-1-piperizinyl; and $R_3$ is selected from the group consisting of hydrogen, amidino, lower alkyl, di(lower) alkyl, phenyl, lower alkylphenyl, halophenyl, phen(lower) alkyl, benzoyl, lower alkanoyl, halo(lower)alkanoyl, dihalo(lower)alkanoyl, lower alkanoyloxy, di(lower) alkylamino(lower)alkanoyl, lower alkylsulfonyl, phenylsulfonyl, lower alkylcarbamoyl, lower alkoxy(lower)alkyl, di(lower) alkylamino(lower)alkyl, dihydroxy(lower)alkyl and 5,5-dimethyl-3-oxo-1-cyclohexen-1-yl; $R_4$ and $R_5$ when taken separately are both selected from the group consisting of hydrogen, dimethyl, lower alkyl, phenyl, halophenyl, lower alkylphenyl, lower alkoxyphenyl and phen(lower) alkyl, and when $R_4$ and $R_5$ are concatenated they form an ethano bridge; and the pharmacologically acceptable acid addition salts thereof. As employed herein the terms "lower alkyl," "lower alkoxy," "lower alkanoyl" and the like are meant to include both branched and straight chain hydrocarbon moieties having from about one to about six carbon atoms.

The compounds of the present invention possess the inherent physical properties of being relatively high melting yellowish to colorless solids, and substantially insoluble in water. Examination of these compounds produced by the hereinafter described processes reveals data confirming the molecular structures hereinbefore set forth. The aforementioned physical characteristics, taken together with the nature of the starting materials and the mode of synthesis positively confirm the structure of the compounds of this invention.

The new and novel compounds of the above Formula I properly are called "tetrahydrobenzonaphthyridines." Typical examples thereof are: 8 - chloro - 1,2,3,4 - tetrahydro - 2 - methyl - 10 - phenylbenzo[b][1,6]naphthyridine and 2 - benzyl - 8 - chloro - 1,2,3,4 - tetrahydro - 10-phenylbenzo[b][1,6]naphthyridine. The compounds of the present invention of Formula I wherein $R_2$ is amino, aminoanilino, anilino, hydrazino and phenylhydrazino may exist in two forms, as shown in by following tautomeric structures:

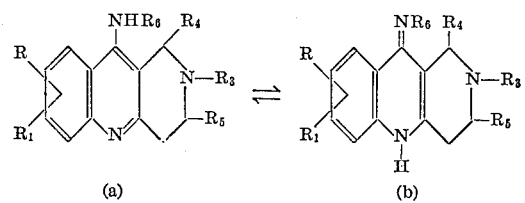

wherein R, $R_1$, $R_3$, $R_4$ and $R_5$ are defined as above; and $R_6$ is selected from the group consisting of hydrogen, aminophenyl, phenyl, amino and phenylamino. For the purpose of simplicity these tautomers (a) and (b) shall hereinafter be designated and named as the 10-position amino compounds of Formula (a), for example:

10-amino-1,2,3,4-tetrahydro-2-methylbenzo[b][1,6] naphthyridine;
10-(o-aminoanilino)-7-chloro-1,2,3,4-tetrahydro-2-methylbenzo[b][1,6]naphthyridine;
10-anilino-8-chloro-1,2,3,4-tetrahydro-2-methylbenzo [b][1,6]naphthyridine;
(8-chloro-1,2,3,4-tetrahydro-2-methylbenzo[b][1,6] naphthyridin-10-yl)hydrizine; and
1-(7-chloro-1,2,3,4-tetrahydro-2-methylbenzo[b][1,6] naphthyridin-10-yl)-2-phenylhydrazine.

It should be understood, however, that the present invention also encompasses and includes the corresponding 10-position imino compounds of Formula (b). When the compounds of this invention are represented by the Formula II they are designated "octahydrobenzonaphthyridines," such as: 2 - benzyl - 8 - chloro - 1,2,3,4,4a, 5-10,10a - octahydrobenzonaphthyridine and 8 - chloro- 1,2,3,4,4a,5,10,10a - octahydro - 2 - methyl - 10 - phenylbenzo[b][1,6]naphthyridine.

Some of the tetrahydrobenzonaphthyridines of the present invention may be prepared by the interaction of a o-aminocarbonyl compound with a 4-piperidone. This first process is further elucidated in the following reaction scheme:

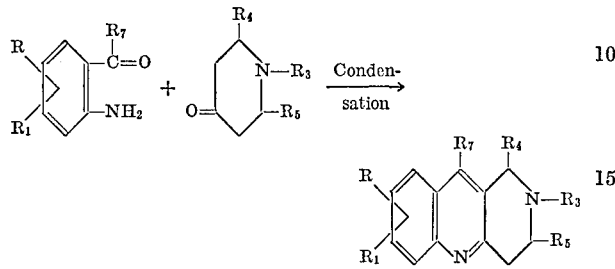

wherein R, $R_1$, $R_3$, $R_4$ and $R_5$ are defined as above, and $R_7$ is selected from the group consisting of phenyl, sulfamylphenyl, carboxyphenyl, halophenyl, lower alkylphenyl, lower alkoxyphenyl, lower alkylthiophenyl, pyridyl, thienyl, and furyl. This reaction is conducted in the presence of a strong acid at a temperature from about 70° C. to about 210° C. for a period of about fifteen minutes to about four hours. Preferably, this reaction is conducted in polyphosphoric or trifluoroacetic acid. When the reaction is complete, the reaction mixture is cooled and then admixed with an ice-water mixture. The resulting solution is then filtered and made basic to separate the appropriate tetrahydrobenzonaphthyridine.

Alternatively, the above-defined tetrahydrobenzonaphthyridines may be prepared by heating the reactants to fusion with the passage of hydrogen chloride gas through the melt. This operation results in an exothermic reaction accompanied by the evolution of water. To complete the reaction the reaction mixture is again heated up to about 200–210° C. The reaction mixture is then cooled, triturated with an alkanol and the product recovered as the hydrochloride salt by conventional means.

In accord with the new and novel process of the present invention, the 10-aminotetrahydrobenzonaphthyridines of this invention may be prepared by the reaction of a 2-aminobenzonitrile with an appropriate 4-piperidone. This second process is exemplified by the following reaction scheme:

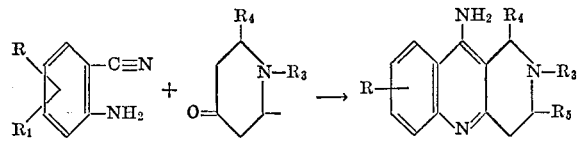

wherein R, $R_1$, $R_3$, $R_4$ and $R_5$ are defined as above. The reaction is effected by heating a substantially equimolar mixture of the reactants, in the presence of a strong acid, at a temperature from about 140° C. to about 200° C. for a period of from about one-half hour to two hours. Preferably, this reaction is conducted in polyphosphoric acid at about 150° C. for about one hour. By strong acid as employed in these first two processes is meant any organic or inorganic acid which dissolves the reactants and does not interfere with their interaction. Although many such acids may be employed, as will suggest themselves to those skilled in the art, excellent results have been obtained with polyphosphoric, trifluoroacetic, acetic and alkanesulfonic and arylsulfonic acids, for example, benzenesulfonic, and toluenesulfonic acid, methylsulfonic acid and ethylsulfonic acid.

After the reaction is complete, the reaction mixture is cooled and basified with an aqueous alkaline solution, for example, sodium hydroxide, potassium hydroxide, sodium bicarbonate and sodium carbonate. Thereafter, the 10-aminotetrahydrobenzonaphthyridine is obtained by conventional methods such as filtration and crystallization from a suitable solvent.

The other tetrahydrobenzonaphthyridines of this invention may be prepared by a third process which is depicted by the following reaction scheme:

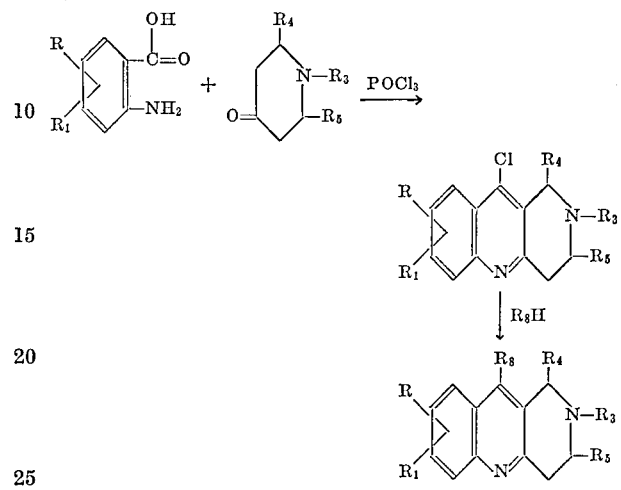

wherein R, $R_1$, $R_3$, $R_4$ and $R_5$ are defined as above, and $R_8$ is selected from the group consisting of aminoanilino, anilino, di(lower)alkylamino(lower)alkylamino, phenoxy, morpholino, 4-alkyl-1-piperazinyl, phenthio, amino(lower)alkylthio, hydrazino and phenylhydrazino. The 10-chlorotetrahydronaphthyridine intermediates are prepared by the interaction of an anthranilic acid, an appropriate 4-piperidone and phosphorus oxychloride at about the reflux temperature of the reaction mixture for a period of about one to about four hours. The reaction mixture is then evaporated, the residue dissolved in a water-immiscible organic solvent, e.g. methylene chloride which is then added to a cold aqueous alkaline solution, e.g. ammonium hydroxide. Thereafter, the 10-chlorotetrahydrobenzonaphthyridine intermediate is separated by standard procedures, e.g. the water layer is washed, dried and evaporated to afford the intermediate which may be further purified by crystallization from a suitable solvent, e.g. a liquid alkane.

The tetrahydrobenzonaphthyridine of this invention wherein $R_8$ is aminoanilino, anilino, di(lower)alkylamino(lower)alkylamino, phenoxy, morpholino and 4-alkyl-1-piperazinyl are prepared by the condensation of an above-prepared 10-chlorotetrahydrobenzonaphthyridine intermediate with an appropriate proton donor reactant, e.g. aminoaniline, aniline, a di(lower)alkylamino(lower)alkylamine; phenol and morpholine. The reaction is effected by admixing a 10-chlorotetrahydrobenzonaphthyridine with phenol and heating the resulting mixture, under an inert atmosphere e.g. nitrogen, to about 100° C. for a period of about fifteen to about thirty minutes. Thereafter, the proton donor reactant is slowly added and the reaction mixture is then heated to about reflux temperatures for a period of about five to about eight hours. When the reaction is complete, the resulting product is recovered by standard procedures, e.g. the product is dissolved in a water-immiscoble organic solvent e.g. methylene chloride, extracted with an aqueous alkali metal hydroxide solution, dried, evaporated to dryness and the residue is then recrystallized from a suitable solvent e.g. benzene.

The tetrahydrobenzonaphthyridines of this invention wherein $R_8$ is arylthio and alkylthio, e.g. phenthio and amino(lower)alkylthio are prepared by the condensation of an above-prepared 10-chlorotetrahydrobenzonaphthyridine with an appropriate mercaptan reactant, e.g. phenyl mercaptan and an amino(lower)alkyl mercaptan. The reaction is effected by admixing a 10-chlorotetrahydrobenzonaphthyridine, an appropriate mercaptan, and from about one to about two molar excess of an aqueous alkali metal hydroxide solution in an alkanol and then heating the resulting mixture to about reflux temperatures for a period of about one to about three hours. When the reaction is complete, the product, a 10-thiotetrahydrobenzonaphthyridine, is separated by conventional recovery methods. For example, the reaction mixture is evaporated to dryness, the residue dissolved in a water-immiscible organic solvent, e.g. methylene chloride, this organic layer is then evaporated to dryness and the residue is recrystallized from an appropriate solvent e.g. hexane. The 10-arylthiotetrahydronaphthyridines may also be prepared by the condensation reaction described hereinafter in Example I.

The tetrahydrobenzonaphthyridines of this invention wherein $R_8$ is hydrazino and phenylhydrazino are prepared by the condensation of an above prepared 10-chlorotetrahydrobenzonaphthyridine with an appropriate hydrazine this reaction is conducted in an alkanol at about reflux temperatures for a period of about one to about eight hours. Thereafter, the resulting product, a tetrahydrobenzonaphthyridinyl hydrazine, is separated by standard procedures, as exemplified hereinafter in Example I.

The above-described 2-lower alkanoyloxy tetrahydrobenzonaphthyridines, the 2-halo(lower)alkanoyl tetrahydrobenzonaphthyridines, the 2-amidino tetrahydrobenzonaphthyridines, the 2-dihydroxy(lower)alkyl tetrahydrobenzonaphthyridines, the 2-di(lower)alkalmino(lower)alkanoyl tetrahydrobenzonaphthyridines, and the 2-dihalo(lower)alkanoyl tetrahydrobenzonaphthyridines may also be prepared by the procedures described in detail in the hereinafter listed Example I.

The octahydrobenzonaphthyridine compounds of the present invention are prepared by the hydrogenation of their corresponding above prepared tetrahydrobenzonaphthyridine, as exemplified by the following reaction:

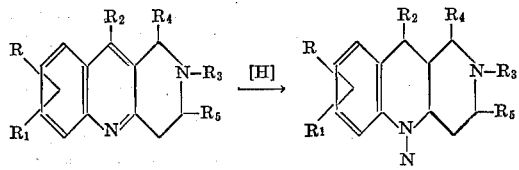

wherein R, $R_1$, $R_2$, $R_3$, $R_4$ and $R_5$ are defined as above. Although various reduction procedures may be employed, a preferred method to effect this conversion is the use of a reducing agent such as hydrogen gas. Utilizing this preferred method, a tetrahydrobenzonaphthyridine is admixed with glacial acetic acid and platinum oxide at about 30° C., under a hydrogen pressure of about 50 p.s.i., for a period of about twenty-four hours. Thereafter, the product is separated by evaporation of the excess acetic acid and the residue is dissolved in water, basified and recrystallized to yield the appropriate octahydrobenzonaphthyridine.

As is evident from the above-described methods of producing the tetrahydrobenzonaphthyridine and octahydrobenzonaphthyridine compounds of this invention, these compounds can be recovered either in the form of their acid addition salts or as the free bases. These tetrahydrobenzonaphthyridine and octahydrobenzonaphthyridine bases can be converted to their acid addition salts by reacting them with the usual acids, e.g. hydrochloric, hydrobromic, hydroiodic, sulfuric and phosphoric or with an organic acid, for example, citric, acetic, benzoic, methanesulfonic or p-toluenesulfonic. While the free bases have the same pharmacological properties as their acid addition salts, they are more often utilized in the preparation of such salts rather than directly for their pharmacological effects.

In accord with the present invention, the new and novel tetrahydrobenzonaphthyridine and octahydrobenzonaphthyridine compounds of this invention have been found to possess interesting pharmacological properties. More particularly, these compounds, in standard pharmacological tests, have exhibited utility as central nervous system depressants which are useful in producing a calming effect, particularly in laboratory and domestic animals.

In the pharmacological evaluation of the central nervous system depressant compounds of this invention the in vivo effects of the compounds of this invention are tested as follows:

The compound is administered orally as a 1 percent suspension emulsified with polyethylene oxide sorbitan monooleate to three mice (14 to 24 grams) at each of the following doses: 400, 127, 40, 12.7 and 4.0 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated for their Sedative-Ataxic Score by use of a pole climb and inclined screen for the presence of sedation-ataxia [Kouzmanoff et al., J. Pharm. Exp. Ther. 144, 40A (1958)]. The "Eddy Hot-Plat Method" [Nathan B. Eddy and Dorothy Leimbach, Jr. Pharmacol. Exper. Therap., 107, 385 (1953)] is used to test for analgesia. The experiment is terminated by subjecting each animal to a maximal electroshock to test for anticonvulsant activity.

The tetrahydrobenzonaphthyridine and octahydrobenzonaphthyridine compound of this invention in the above test procedure produce decreased motor activity when administered at a dosage range from 12.7 to 400 mg./kg.; produce decreased respiration when administered at a dosage range from 40 to 400 mg./kg. and rate a sedative-ataxic score of 1–2 when administered at a dosage range from 40 to 400 mg./kg. There were no deaths at the highest dose used, 400 mg./kg.

When the tetrahydrobenzonaphthyridine and octahydrobenzonaphthyridine compounds of this invention are employed as central nervous system depressants to produce a calming effect in warm-blooded animals, e.g., mice, rats, rabbits, dogs, cats, monkeys, etc. they may be administered alone or in combination with pharmacologically acceptable carriers, the proportion of which is determined by the solubility and chemical nature of the compounds, chosen route of administration and standard biological practice. For example, they may be administered orally in the form containing such excipients as starch, milk, sugar and so forth. They may also be administered orally in the form of solutions or they may be injected parenterally. For parenteral administration they may be used in the form of a sterile solution containing other solutes, for example, enough saline or glucose to make the solution isotonic.

The dosage of the present tetrahydrobenzonaphthyridines and octahydrobenzonaphthyridines compounds when employed as central nervous system depressant agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

Further, it has been surprisingly found that 8-chloro-1,2,3,4-tetrahydro - 1,1,3,3 - tetramethyl-10-phenylbenzo[b][1,6]naphthyridine and 8-chloro - 1,2,3,4 - tetrahydro-10-phenylbenzo[b][1,6]naphthyridine of the present invention also possess valuable amebicidal activity. In particular, when tested in standard in vitro screening procedures these two compounds have demonstrated anti-amebic activity, especially against Endameba histolytica and are, therefore, useful as anti-amebic agents.

In the amebicidal evaluation of these two compounds of this invention, the test compound is incorporated and diluted in the aqueous phase of Boeck-Drbohlav diphasic medium fortified with rice starch. The medium is inoculated with polybacteria and a known number of trophozoites of *E. histolytica* NIH 200. After forty-eight hours incubation at 35° C., the trophozoites are counted. The procedure is derived from Thompson et al., Antibo. and Chemo., 6, 337–50 (1956). The endpoint is expressed as the percent of *E. histolytica* killed at a particular concentration (μg./ml.) of test compound. In this test, 8-chloro-1,2,3,4-tetrahydro-1,1,3,3 - tetramethyl-10-phenylbenzo[b][1,6]naphthyridine averaged about a percent kill of *E. histolytica* at a concentration of μg./ml. and 8-chloro-1,2,3,4 - tetrahydro-10-phenylbenzo[b][1,6]naphthyridine averaged about a 100 percent kill of *E. histolytica* at a concentration of about 5 μg./ml.

The anti-amebic activity of these two compounds of this invention can be utilized for washing equipment in hospitals and homes, instruments used in medicine and bacteriology, clothing used in bacteriological laboratories, and floors, walls and ceiling in rooms in which a background free of *E. histolytica* is desired.

Still further, it has been unexpectedly found that 8-chloro-1,2,3,4-tetrahydro-1,1,3,3-tetrahydromethyl-10-phenylbenzo[b][1,6]naphthyridine;
8-chloro-1,2,3,4-tetrahydro-2-phenethyl-10-phenylbenzo[b][1,6]naphthyridine;
8-chloro-1,2,3,4-tetrahydro-2-methyl-10-phenyl-1,3-ethanolbenzo[b][1,6]naphthyridine;
1,2,3,4-tetrahydro-1,1,3,3-tetramethyl-10-(p-tolyl)benzo[b][1,6]naphthyridine;
6-chloro-1,2,3,4-tetrahydro-1,1,3,3-tetramethyl-10-phenylbenzo[b][1,6]naphthyridine;
7-chloro-1,2,3,4-tetrahydro-1,1,3,3-tetramethyl-10-(p-methylthiophenyl)benzo[b][1,6]naphthyridine;
7,8-dimethoxy-1,2,3,4-tetrahydro-1,1,3,3-tetramethyl-10-(p-methoxyphenyl)benzo[b][1,6]naphthyridine;
8-chloro-2-chloroacetyl-1,2,3,4-tetrahydro-10-phenylbenzo[b][1,6]naphthyridine;
2-amidino-8-chloro-1,2,3,4-tetrahydro-10-phenylbenzo[b][1,6]naphthyridine;
m-(2-benzyl-8-chloro-1,2,3,4-tetrahydro-10-benzo[b][1,6]naphthyridinyl)benzenesulfonamide;
2-benzyl-6-chloro-1,2,3,4-tetrahydro-10-phenylbenzo[b][1,6]naphthyridine;
2-benzyl-7-chloro-1,2,3,4-tetrahydro-10-phenylbenzo[b][1,6]naphthyridine;
10-anilino-7-chloro-1,2,3,4-tetrahydro-2-methylbenzo[b][1,6]naphthyridine;
7-chloro-1,2,3,4-tetrahydro-2-methyl-10-(phenylthio)benzo[b][1,6]naphthyridine;
1-(7-chloro-1,2,3,4-tetrahydro-2-methylbenzo[b][1,6]naphthyridin-10-yl)-2-phenylhydrazine;
10-anilino-8-chloro-1,2,3,4-tetrahydro-2-methylbenzo[b][1,6]naphthyridine; and
3-(8-chloro-1,2,3,4-tetrahydro-10-phenylbenzo[b][1,6]naphthyridin-2-yl)-5,5-dimethyl-2-cyclohexan-1-one also possess valuable antibacterial properties. More particularly, these seventeen compounds, when tested in standard bacteriological procedures have exhibited utility as antibacterial compounds, especially as antitubercular agents.

The in vitro bacteriocidal activity of these seventeen compounds of this invention against tubercle bacilli is tested by the following procedure:

A stock solution containing 1000 μg./ml. of a test compound in a suitable vehicle e.g. water is prepared. One ml. quantities of various dilutions of this stock solution are added to individual tubes containing 9 ml. of medium to give final concentrations within the range of 0.01 to 100 μg./ml. These tubes are then seeded with 0.1 ml. of standardized bacterial suspension and incubated for two weeks at 37° C. The media employed in Dubos Oleic acid liquid medium and the stock cultures are maintained on Dorset Egg Agar. The organisms used are *M. tuberculosis,* human type, strain H 37 Rv and *M. tuberculosis,* bovine type, strain Ravenel. The results are expressed as minimal inhibitory concentration (MIC) in μg./ml. which is the least concentration of a compound that will completely prevent the growth of the organism. In the above test, these seventeen tetrahydrobenzonaphthyridine compounds of this invention completely inhibit the growth of tubercle bacilli at a MIC in the range of about 0.5 to about 50 μg./ml.

As has been mentioned hereinabove, these latter seventeen tetrahydrobenzonaphthyridine compounds of this invention are also biocidally active, as antibacterial agents. In this connection, they exhibit activity against pathogenic bacteria, specifically in vitro antitubercular activity as bacteriocidal agents against tubercle bacteria. Their bacteriocidal properties make these seventeen compounds valuable in biocidal compositions in a variety of important fields for use. For example, they can be formulated and used in bacteriocidally active institutional cleaning compositions, and in soaps and detergents. These compositions are employed for washing equipment in hospitals and homes, instruments used in medicine and bacteriology, clothing used in bacteriological laboratories, and floors, walls and ceiling in rooms in which a background free of tubercle bacteria is desired. When either the two above-described anti-amebic agents or the seventeen aforesaid anti-tubercular agents are used for their biocidal purposes, they are applied according to their desired end-uses as powders, solutions, suspensions and the like, containing the active substance generally in concentrations of 0.1% to 0.7% by weight, or even as much as 1%, 1.5%, 1.8%, 2% and up to about 5%. In washing solutions, e.g. for hospitals and homes, the active anti-amebic and anti-tubercular compounds of this invention will be generally in the range of from about 0.02% to .25% by weight.

Although, in common with most organic substances, with relatively high molecular weights, the anti-amebic and anti-tubercular compounds of this invention have limited solubility in water, those skilled in the art will have no great difficulty in formulating them into a wide variety of biocidally-active compositions. In general, standard techniques can be employed and, where necessary, advantage is taken of the ability of these compounds to form salts with acids, which have enhanced solubility in water. The active compounds per se can be made up in dilute aqueous solution. They can also be formulated as suspensions or solutions in an aqueous vehicle containing an organic co-solvent, such as, for example, an alkanol. Also, aqueous vehicles containing emulsifying agents, such as sodium lauryl sulfate, and relatively high concentrations, e.g., up to about 5% by weight, of the compounds of this invention can be formulated by conventional techniques.

The reactants employed in the first three above-described processes are known compounds which are commercially available and/or prepared by well known procedures. In this regard, the "4-piperidone" reactants may be prepared by the methods described in S. M. McElvain and K. Rorig in J. Am. Chem. Soc. 70, 1829 (1948); S. M. McElvain in J. Am. Chem. Soc 46, 1725 (1924); S. M. McElvain in J. Am. Chem. Soc 48, 2179 (1926); S M. McElvain and G. Stork in J. Am. Chem. Soc. 68, 1049 (1946); J. R. Thayer and S. M. McElvain in J. Am. Chem. Soc. 49, 2862 (1927); J. B. Baty, G. Jones and C. Moore in J. C. pg. 2645 (1967); and J. Guareschi, Ber. 28, 160 (1895).

The "o-aminocarbonyl compound" reactants employed in the first above-described process may be prepared by the procedure described by: G. N. Walker in J. Org. Chem., 27 1929 (1962); F. Korte and O. Behner in Ann. 621, 51 (1959); S. Bell et al., in U.S. Pat. No. 3,516,992 of June 23, 1970 entitled "3-(2-Amino-5-Halo, 5-Alkyland 5-Alkoxy)Benzene Sulfonamides"; L. H. Sternbach et al. in J. Org. Chem. 26, 448 (1961); and L. H. Sternbach et al. in J. Org. Chem. 27, 3781 (1962).

The "2-aminobenzonitrile" reactants employed in the new and novel second above-described process may be prepared by the procedures described by: S. Gabriel in Ber. 36, 804 (1903); J. Pinnow and C. Samann in Ber. 29, 624 (1896); W. Borsche, H. Weussman and A. Fritzsche in Ber. 57, 1151 (1924); and L. H. Sternbach et al. in J. Org. Chem. 27, 3781 (1962).

The "anthranilic acid" reactants employed in the third above-described process may be prepared by the procedures described in the text "Chemistry of Carbon Compounds," vol. 3A, pg. 576–8, editor E. H. Rodd, Elsevien, New York (1954).

EXAMPLE I 1-methyl-4-piperidone (66.0 g., 0.58 m.) is slowly added to a slurry of 4-chloroanthranilic acid (100.0 g., 0.58 m.) in phosphorous oxychloride (500 ml.) and the resulting mixture refluxed for two hours. The solvent is evaporated and the residue taken up in methylene chloride (2 liters). This is slowly added to a stirred ammonium hydroxide-ice solution (10 liters). The methylene chloride solution is washed with water, dried over anhydrous sodium sulfate and evaporated giving 139.0 g. of a green solid. This solid is extracted with 1.5 l. of hexane, treated with charcoal, concentrated and crystallized giving 79.0 g. (49%) of crude product. Recrystallization from hexane gives 7,10-dichloro - 1,2,3,4 - tetrahydro-2-methylbenzo[b][1,6] naphthyridine as a yellow crystalline solid, M.P. 114–5° C. (uncorr.).

Analysis.—Calcd. for $C_{13}H_{12}Cl_2N_2$ (percent): C, 58.46; H, 4.53; N, 10.49. Found (percent): C, 58.63; H, 4.28; N, 10.23.

The above prepared 7,10 - dichloro - 1,2,3,4-tetrahydro-2 - methylbenzo[b][1,6]naphthyridine (5.0 g., 0.018 m.), and 3.36 g. (0.036 m.) of phenol are heated under nitrogen at 100° C. for fifteen minutes until a clear melt is obtained. Aniline (3.3 ml., 0.036 m.) is then added dropwise with stirring and the mixture is heated at 135–140° C. for five hours. The reaction product is dissolved in methylene chloride and extracted with a 20% potassium hydroxide solution. After being dried over anhydrous sodium sulfate, the methylene chloride solution is evaporated giving the free base. This product is triturated with ethyl acetate and recrystallized twice from acetonitrile giving 4.0 g. (69%) of 10-anilino-7-chloro-1,2,3,4-tetrahydro-2-methylbenzo[b][1,6]naphthyridine as a crystalline solid, M.P. 197–8° C. (red melt) (uncorr.).

Analysis.—Calcd. for $C_{19}H_{18}ClN_3$ (percent): C, 70.47; H, 5.60; N, 12.98. Found (percent): C, 70.40; H, 5.40; N, 12.72.

In a similar manner, the following compounds are prepared:

7,10 - dichloro - 1,2,3,4-tetrahydro-2-methylbenzo[b] [1,6]naphthyridine (5.0 g., 0.018 m.) and phenol (3.38 g., 0.036 m.) are reacted to form the free base which is recrystallized three times from hexane to yield 7-chloro-1,2,3,4 - tetrahydro - 2 - methyl - 10 - phenoxybenzo[b] [1,6]naphthyridine as a crystalline solid, M.P. 138–9° C. (uncorr.).

Analysis.—Calcd. for $C_{19}H_{17}ClN_2O$ (percent): C, 70.25; H, 5.27; N, 8.64. Found (percent): C, 70.50; H, 4.91; N, 8.87.

7,10 - dichloro - 1,2,3,4 - tetrahydro - 2-methylbenzo[b][1,6]naphthyridine (8.0 g., 0.03 m.), 5.65 g. (0.06 m.) of phenol and 7.0 g. (0.07 m.) of N-methylpiperazine are reacted to form the free base which is triturated with pentane and recrystallized from hexane giving 7-chloro-1,2,3,4 - tetrahydro - 2 - methyl - 10 - (4-methyl-1-piperazinyl)benzo[b][1,6]naphthyridine as a crystalline solid, M.P. 114–5° C. (uncorr.).

Analysis.—Calcd. for $C_{18}H_{23}ClN_4$ (percent): C, 65.33; H, 7.02; N, 16.94. Found (percent): C, 65.74; H, 6.97; N, 16.79.

7,10 - dichloro - 1,2,3,4-tetrahydro-2-methylbenzo[b] [1,6]naphthyridine (10.0 g., 0.0375 m.), 7.05 g. (0.075 m.) of phenol and 8.1 g. (0.075 m.) of o-phenylenediamine are reacted to form the free base which is triturated with carbon tetrachloride and recrystallized twice from methanol giving 10-(o-aminoanilino)-7-chloro-1,2,3,4-tetrahydro-2-methylbenzo[b][1,6]naphthyridine as a crystalline solid, M.P. 189–192° C. (uncorr.).

Analysis.—Calcd. for $C_{19}H_{19}ClN_4$ (percent): C, 67.35; H, 5.65; N, 16.54. Found (percent): C, 67.23; H, 5.79; N, 16.39.

When the above products are hydrogenated in glacial acetic acid (100 ml.) containing platinum oxide (0.3 g.) at room temperature, and an initial hydrogen pressure of 46.5 p.s.i. for a period of twenty-four hours. The excess acetic acid is distilled in vacuo, the residue dissolved in water, and then basified whereupon the crude product separates. When recrystallized from cyclohexane-hexane the following compounds are obtained:

10-anilino-7-chloro-1,2,3,4,4a,5,10,10a-octahydro-2-methylbenzo[b][1,6]naphthyridine;
7-chloro-1,2,3,4,4a,5,10,10a-octahydro-2-methyl-10-phenoxybenzo[b][1,6]naphthyridine;
7-chloro-1,2,3,4,4a,5,10,10a-octahydro-2-methyl-10-(4-methyl-1-piperazinyl)benzo[b][1,6]naphthyridine; and
10-(o-aminoanilino)-7-chloro-1,2,3,4,4a,5,10,10a-octahydro-2-methylbenzo[b][1,6]naphthyridine.

What is claimed is:

1. A compound selected from the group consisting of those having the formulae:

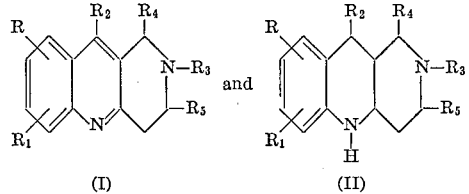

wherein R is hydrogen and $R_1$ is selected from the group consisting of hydrogen, halogen, lower alkyl and lower alkoxy; $R_2$ is 4-(lower)alkylpiperazino; and $R_3$ is selected from the group consisting of hydrogen, lower alkyl, dimethyl, halophenyl, phen(lower)alkyl, benzoyl, lower alkanoyl, halo(lower)alkanoyl, dihalo(lower)alkanoyl, lower alkanoyloxy, di(lower)alkylamino(lower)alkanoyl, and di(lower)alkylamino(lower)alkyl; $R_4$ is selected from the group consisting of hydrogen, dimethyl, lower alkyl, lower alkoxyphenyl and phen(lower)alkyl; $R_5$ is hydrogen; and the pharmacologically acceptable acid addition salts thereof, wherein (lower)alkyl, (lower)alkoxy and (lower)alkanoyl have hydrocarbon moieties of from one to six carbon atoms.

2. The compound as defined in claim 1 Formula I wherein R, $R_4$ and $R_5$ are hydrogen; $R_1$ is chloro fixed in the 7-position; $R_2$ is 4-methylpiperazino; and $R_3$ is methyl which is: 7 - chloro - 1,2,3,4-tetrahydro-2-methyl-10-(4-methyl-piperazino)benzo[b][1,6]naphthyridine.

References Cited

UNITED STATES PATENTS 3,401,201 9/1968 Walton _____ 260—288 X
3,503,981 3/1970 Suess _____ 260—268
3,542,780 11/1970 Freed _____ 260—268 TR

OTHER REFERENCES

Chem. Abstr., vol. 70, col. 96780y, abstracting France 1,514,010.

DONALD G. DAUS, Primary Examiner

U.S. Cl. X.R.

424—250